US011324243B2

(12) United States Patent
Hundt et al.

(10) Patent No.: US 11,324,243 B2
(45) Date of Patent: May 10, 2022

(54) OIL-IN-WATER EMULSIONS FOR MEAT AND POULTRY PRODUCTS AND METHODS OF PRODUCING SAME

(71) Applicant: Exceldor Foods Canada Ltd., Hanover (CA)

(72) Inventors: Murray Thomas Hundt, Hanover (CA); Megan Dawn Kraus, Durham (CA); Ryan David Mercey, Hanover (CA)

(73) Assignee: Exceldor Foods Canada Ltd., Hanover (CA)

( * ) Notice: Subject to any disclaimer, the term of this patent is extended or adjusted under 35 U.S.C. 154(b) by 0 days.

(21) Appl. No.: 16/528,974

(22) Filed: Aug. 1, 2019

(65) Prior Publication Data

US 2019/0350235 A1 Nov. 21, 2019

Related U.S. Application Data

(62) Division of application No. 15/645,173, filed on Jul. 10, 2017, now Pat. No. 10,736,344.

(60) Provisional application No. 62/360,622, filed on Jul. 11, 2016.

(51) Int. Cl.
| | | |
|---|---|---|
| *A23L 13/70* | (2016.01) | |
| *A23L 13/40* | (2016.01) | |
| *A23L 27/00* | (2016.01) | |
| *A23L 29/10* | (2016.01) | |

(52) U.S. Cl.
CPC .............. *A23L 13/72* (2016.08); *A23L 13/43* (2016.08); *A23L 27/80* (2016.08); *A23L 29/10* (2016.08); *A23V 2002/00* (2013.01)

(58) Field of Classification Search
CPC .......... A23L 13/72; A23L 13/43; A23L 27/80; A23L 29/10; A23L 13/00; A23L 13/70
USPC ....................................................... 426/89
See application file for complete search history.

(56) References Cited

U.S. PATENT DOCUMENTS

| | | |
|---|---|---|
| 2,555,597 A | 6/1951 | Nault |
| 3,338,150 A | 8/1967 | Nordin |
| 3,399,063 A | 8/1968 | Schwall et al. |
| 3,528,820 A | 9/1970 | Schwall et al. |
| 3,615,689 A | 10/1971 | Malinow et al. |
| 3,695,892 A | 10/1972 | Reinke |
| 3,779,151 A | 12/1973 | Ross |
| 3,922,357 A | 11/1975 | Townsend |
| 4,352,573 A | 10/1982 | Pandolfe |
| 4,663,173 A | 5/1987 | Clatfelter et al. |
| 4,690,046 A | 9/1987 | Corominas |
| 4,746,522 A | 5/1988 | Wofford et al. |
| 4,946,702 A | 8/1990 | Stipp et al. |
| 4,960,599 A | 10/1990 | Cozzini et al. |
| 4,988,524 A | 1/1991 | Obata |
| 5,039,539 A | 8/1991 | Tamaki et al. |
| 5,071,666 A | 12/1991 | Handel et al. |
| 5,142,971 A | 9/1992 | Norrie |
| 5,232,726 A | 8/1993 | Clark et al. |
| 5,449,524 A | 9/1995 | Ludwig |
| 5,899,564 A | 5/1999 | Kinney et al. |
| 6,627,240 B1 | 9/2003 | Samson |
| 8,048,461 B2 | 11/2011 | Cozzini |
| 8,859,027 B2 | 10/2014 | van Esbroeck et al. |
| 2002/0119239 A1 | 8/2002 | Shiiba et al. |
| 2002/0155201 A1 | 10/2002 | Okada et al. |
| 2009/0004353 A1 | 1/2009 | Topps |
| 2009/0220652 A1 | 9/2009 | Gardner et al. |
| 2010/0310738 A1 | 12/2010 | Ludwig |
| 2012/0027899 A1 | 2/2012 | Topps |
| 2013/0078347 A1 | 3/2013 | van Esbroeck et al. |
| 2015/0050399 A1* | 2/2015 | van Gastel ........... A23D 7/0053 426/243 |

FOREIGN PATENT DOCUMENTS

| | | |
|---|---|---|
| EP | 0327738 A1 | 8/1989 |
| EP | 1402783 A1 | 3/2004 |
| EP | 2263482 A1 | 12/2010 |
| EP | 2625960 A1 | 8/2013 |
| EP | 2625969 A1 | 8/2013 |
| WO | 2005094617 A1 | 10/2005 |
| WO | 2008134306 A1 | 11/2008 |
| WO | 2013117399 A1 | 8/2013 |

OTHER PUBLICATIONS

P. Dhankhar. Homogenization Fundamentals. IOSR Journal of Engineering. vol. 04, Issue 05 (May 2014), pp. 01-08.
L.M. Diamante and T. Lan. Absolute Viscosities of Vegetable Oils at Different Temperatures and Shear Rate Range. J. Food Processing, vol. 2014.
A. Bratsikhin and A. Borisenko. New Method of Emulsified Meat Foodstuffs Manufacturing. Journal of Hygiene Engineering and Design. 2014 vol. 7 pp. 162-168.
Kantha Shelke. Making Oil and Water Mix. www.preparedfoods. com. Feb. 15, 2016 [online], [retrieved on Feb. 19, 2020]. Retrieved from the Internet:<URL: https://www.preparedfoods.com/articles/117721-making-oil-and-water-mix>.

* cited by examiner

*Primary Examiner* — Jyoti Chawla
(74) *Attorney, Agent, or Firm* — Bereskin & Parr LLP/S.E.N.C.R.L., s.r.l.; Ainslie Parsons

(57) ABSTRACT

The disclosure provides methods and processes for the preparation of oil-in-water emulsions by mechanical means and injection of the emulsions into meat and poultry to improve eating qualities associated with flavour, juiciness, tenderness and fat content. The disclosure also provides a meat or poultry product prepared by the methods described herein.

2 Claims, 3 Drawing Sheets

OIL-IN-WATER EMULSIONS FOR MEAT AND POULTRY PRODUCTS AND METHODS OF PRODUCING SAME

CROSS-REFERENCE TO RELATED APPLICATIONS

This application is a division of U.S. patent application Ser. No. 15/645,173, filed on Jul. 10, 2017 which claims priority to U.S. Provisional Patent Application No. 62/360,622 filed Jul. 11, 2016, the contents of which are incorporated by reference herein in their entirety.

FIELD OF THE DISCLOSURE

The disclosure relates to methods and processes for the preparation of oil-in-water emulsions by mechanical means and injection of the emulsions into food products such as meat and poultry products to improve eating qualities associated with flavour, juiciness, tenderness and fat content. The disclosure also relates to emulsions and food products prepared by the disclosed methods.

BACKGROUND OF THE DISCLOSURE

Numerous recipes to enhance the flavour, juiciness and tenderness of meat and poultry are known. These predominantly are rubs, marinades and bastes that are applied to the surface of the meat and are used during grilling or several hours before cooking. Rubs include spices and herb mixtures. Marinades are made up of several components including oil which is used to help keep the meat moist, an acidic liquid such as vinegar or citrus juice to help tenderize, as well as herbs and spices for flavouring. Bastes, liquid solutions that generally contain some oil, are applied to keep the meat moist and to seal in the juices. These methods have the drawbacks of not distributing the enhancements consistently and throughout the meat.

Commercial processes directed toward enhancing flavour, juiciness and tenderness of meat and poultry have emphasized injection techniques for bastes and solutions. This creates the possibility of distributing the enhancements better in the meat. These techniques are often used to compensate for lost juices that result from lengthy cooking periods. Various innovations in injection technology have been made and are widely used for commercial processing, but involve difficulties and inconveniences, especially as they relate to adopting popular consumer recipes and 'clean labels'.

Malinow, U.S. Pat. No. 3,615,689 discloses a method of injected basting of an edible fat emulsion into the breasts of turkey with an amount of emulsion equaling 3 percent of the carcass weight. The basting emulsion is composed of a minor amount of water with a major amount of vegetable oil, using a mixed hydrophilic-lipophilic emulsifier and ingredients such as salt, flavouring, colouring materials, etc. The water-in-oil mixture must not separate and remain a smooth emulsion for processing and thus an emulsifier is used to form a stable emulsion. Further, this technique is a manual (not a continuous) process which increases manufacturing cost.

Additional flavour and moisture enhancing solutions have been developed to enhance the eating qualities of meat and poultry. Dressed meat can be injected with a solution, typically by multi-needle injection. This technique involves piercing the meat thereby improving the tenderness and overall textural quality of meat. This technique is well understood in the industry; some standard apparatus and methods are disclosed in U.S. Pat. No. 3,338,150 (Nordin), U.S. Pat. No. 3,779,151 (Ross), U.S. Pat. No. 3,922,357 (Townsend), and U.S. Pat. No. 4,690,046 (Corominas).

Other prior art techniques of increasing the water-binding capacity of the meat involve injecting solutions containing dissolved sodium chloride and sodium tripolyphosphate. Without these ingredients, the solution may leak out of the meat product during distribution or during cooking by the consumer creating a problem of excess weight loss and little improvement in quality. However, this technique can be undesirable due to nutritional considerations such as the sodium and phosphate contents of the resultant meat products which adversely impact their consumer appeal. In addition, many desirable additives cannot be utilized in the prior art injection solutions. Examples include oil products such as butter that do not mix in water and ingredients like native starches that do not dissolve in water but disperse instead. As a result, oil and insoluble ingredients do not distribute uniformly throughout the water solutions or remain homogeneous through the injection process or otherwise plug the hollow injection needles.

A moisture enhancing process for meat and poultry typically increases the weight of the product about eight to twenty percent. Although some of this added water evaporates during cooking, the meat has a higher water content when cooking commences, and thus, the cooked meat may have a higher moisture content after cooking as compared to a non-enhanced meat. Prior art techniques utilize high levels of salt and sodium phosphate to influence moisture retention.

Consumers today want 'clean labels', which focus on fewer and more natural ingredients and includes claims such as no additives, no preservatives and no artificial flavours or colours. Accordingly, a need remains for a process which utilizes oil-in-water emulsions or extremely fine dispersions of insoluble natural ingredients that can be distributed throughout a meat and poultry product to enhance flavor, juiciness and tenderness while limiting the amount of fat.

SUMMARY OF THE DISCLOSURE

The disclosure relates to methods and devices for the preparation of oil-in-water emulsions by mechanical means and injection of the emulsions into food products such as meat and poultry to improve eating qualities associated with flavour, juiciness, tenderness and fat content, and to the food product produced thereby, especially turkey.

Accordingly, the present disclosure provides a method of preparing a food product comprising:

a) preparing a first liquid phase comprising at least one water soluble component dissolved in water;

b) preparing a second liquid phase comprising an edible fat, wherein the second liquid phase is at a temperature above the melting point of the edible fat;

c) homogenizing the first liquid phase and the second liquid phase together to provide an emulsified product; and d) providing the emulsified product to the food product.

In one embodiment, the temperature of the first liquid phase is not more than 10, 9, 8, 7, 6 or 5 degrees Celsius lower than the temperature of the second liquid phase.

In another embodiment, the emulsified product is injected into the food product.

In another embodiment, the homogenizing comprises mechanical homogenizing.

In another embodiment, the mean size of the particles in the emulsified product is less than 10 μM, optionally less than 9.5, 9.0, 8.5 or 8.0 μM.

In another embodiment, the emulsified product is free from an emulsifying agent.

In another embodiment, the emulsified product is at a temperature that allows injection of the emulsified product into the food. Optionally, the temperature of the emulsified product is 45 to 70° C., optionally 50 to 65° C. or about 55 to 60° C.

In another embodiment, the first liquid phase and second liquid phase are combined immediately prior to, or during, homogenization.

In another embodiment, the emulsified product solidifies in the food product.

In another embodiment, the method further comprises e) vacuum packaging and/or quick freezing the food product.

In one embodiment, the food product is meat or poultry. In another embodiment, the food product is turkey. In yet another embodiment, the food product is chicken, beef, veal, pork, lamb or fish.

In another embodiment, the edible fat comprises butter, olive oil, extra virgin olive oil, corn oil, canola oil, soybean oil, margarine, sour cream or yogurt.

In another embodiment, the water soluble component comprises salt, sea salt, seasoning, broth or flavouring extract.

In another embodiment, the method comprises providing a third liquid phase comprising an insoluble component and homogenizing the first liquid phase, the second liquid phase and the third liquid phase together to provide the emulsified product. Optionally, the insoluble component comprises spices, herbs, vegetable gum or starch.

The disclosure also provides a food product prepared by the method disclosed herein.

In one embodiment, the food product comprises 1 to 30%, optionally 5-25% or 10-20%, emulsified product by weight of the food product.

The disclosure further provides an emulsified product for injection into a food product comprising:

a first liquid phase comprising at least one water soluble component dissolved in water, and a second liquid phase comprising an edible fat, wherein the emulsified product is homogenized.

In one embodiment, the emulsion is maintained at a temperature above the melting point of the edible fat.

In another embodiment, the temperature of the emulsified product is 45 to 70° C., optionally 50 to 65° C. or about 55 to 60° C.

In another embodiment, the edible fat comprises butter, olive oil, extra virgin olive oil, corn oil, canola oil, soybean oil, margarine, sour cream or yogurt. In a further embodiment, the water soluble component comprises salt, sea salt, seasoning, broth or flavouring extract.

In another embodiment, the emulsified product comprises 20 to 40% of the first liquid phase and 60 to 80% of the second liquid phase by weight.

In another embodiment, the homogenized mixture comprises a third liquid phase comprising an insoluble component. Optionally, the insoluble component comprises spices, herbs, vegetable gum or starch.

In another embodiment, the emulsified product is free from an emulsifying agent.

In another embodiment, the mean size of the particles in the emulsified product are less than 10 μM, optionally less than 9.5, 9.0, 8.5 or 8.0 μM.

The disclosure further provides a food product comprising the emulsified product disclosed herein.

In one embodiment, the food product comprises 1 to 30%, optionally 5-25% or 10-20% emulsified product by weight of the food product.

In one embodiment, the food product is meat or poultry. In another embodiment, the food product is turkey. In yet another embodiment, the meat product is chicken, beef, veal, pork, lamb or fish.

In another embodiment, the food product is vacuum packaged and/or quick-frozen.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

The disclosure will now be described in relation to the drawings in which.

DETAILED DESCRIPTION OF THE DISCLOSURE

Figure 1:
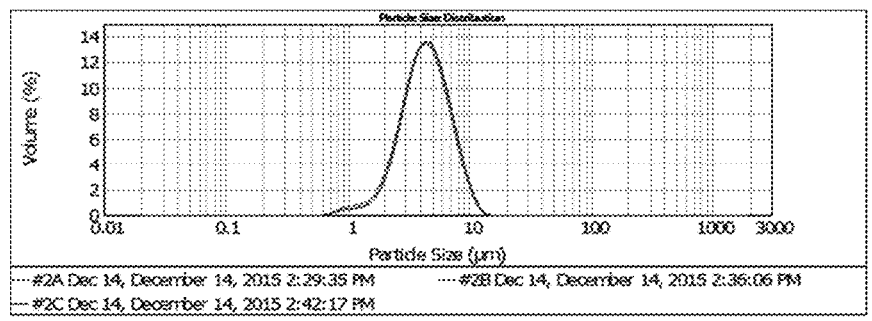
FIG. 1 shows the particle size distribution (in μM) of samples 2A, 2B and 2C of the emulsion prepared in Example 1.

The present disclosure provides methods and processes for enhancing meat products with oil-in-water emulsions or extremely fine dispersions of insoluble ingredients. The moisture, fat, salt and flavourings are optimized in the emulsions to give the enhanced meat a desired amount of juiciness and flavor without negatively impacting the nutritional value of the product and without using additives such as sodium phosphate.

Methods

Accordingly, the disclosure provides a method of preparing a food product comprising:

a) preparing a first liquid phase comprising at least one water soluble component dissolved in water;

b) preparing a second liquid phase comprising an edible fat, wherein the second liquid phase is maintained at a temperature above the melting point of the edible fat;

c) homogenizing the first liquid phase and the second liquid phase together to provide an emulsified product; and d) providing the emulsified product to the food product.

As used herein, the term "food product" includes any edible product. Examples of food products useful in the disclosed methods include meat, fish and poultry products, in particular, turkey, chicken, beef, veal, pork or lamb.

The "first liquid phase" comprises water to which at least one water soluble ingredient is added. Examples of water soluble ingredients include, but not limited to, salt, sea salt, seasoning, broth and flavouring extract. In one embodiment, the first liquid phase is similar to a conventional liquid brine. The water soluble ingredient is optionally added to the water in an amount of 0.5 to 50 parts ingredient, 1 to 20 parts ingredient, 3 to 10 parts ingredient or 5 parts ingredient to 100 parts water. The first liquid phase optionally comprises a plurality of water soluble ingredients.

The "second liquid phase" comprises at least one edible fat. Edible fats include, but are not limited to, vegetable oils such as canola, corn, olive, soybean, extra virgin olive oil or melted fats such as margarine, butter and cultured butter. Also contemplated are edible dairy fats such as yogurt or sour cream. The second liquid phase optionally comprises a plurality of edible fats such as a blend of canola oil and extra virgin olive oil.

In some embodiments, a "third liquid phase" is also provided. The third liquid phase comprises water to which at least one non-soluble ingredient in water is added. Non-soluble ingredients useful in the present methods include, but are not limited to, dry ingredients like native spices, herbs, vegetable gums and starches. The third liquid phase optionally comprises a plurality of non-soluble ingredients.

In one embodiment, spice extractives are added to at least one of the liquid phases, optionally the first liquid phase, the second liquid phase, and/or the third liquid phase. Spice extractives can be added in either the volatile oil form or oleoresin form. Examples of volatile oils include, but are not limited to, celery seed, rosemary, thyme, sage and savory. Examples of oleoresins include, but are not limited to, black pepper and red pepper. Volatile oils and oleoresins are useful because they can be standardized for flavour strength. In addition, they are microbiologically sterile and the foreign mater and undesirable portions of the botanicals are eliminated. In another embodiment, dry spices are added to the meat product in an optional dry phase addition.

Temperature has a strong influence on the viscosity of liquids, with viscosity generally decreasing with an increase in temperature. This is especially true for oils and fats. Maintaining the liquidity of each of the liquid phases allows the emulsified product to be injected into meat and allows the use of continuous processing systems and equipment to perform the disclosed methods. Accordingly, in one embodiment of the present disclosure, temperature ranges tailored to the edible fat(s) of the present disclosure that reduce the viscosity of the fat and/or raises the temperature above its melting point are utilized. This allows the fat to be pumped, formulated by quantity controlled dosage pumps, and/or remain emulsified such that it can be injected into meat. Specifically, in one embodiment of the disclosure, the second liquid phase is maintained at a temperature that keeps the second liquid phase from solidifying. A temperature above the melting point of the edible fat ingredient is important in this process otherwise the fat crystallizes or solidifies causing inconsistent product quality or plugging of needles. However, a temperature too high will cause the fat to burn changing its taste and appearance or cause the meat to cook along the injection site affecting the distribution and retention of the emulsion in the product. In some embodiments, the preferred outcome is to process at a low temperature to retard outgrowth of pathogens and spoilage bacteria. For most processing activities and steps for meat products 10° C. is considered sufficient.

Therefore, in one embodiment, the second liquid phase has a temperature above the melting point of the at least one edible fat. In embodiments where the second liquid phase comprises multiple edible fats, the second liquid phase has a temperature above the melting point of the edible fat with the highest melting point. Optionally, the second liquid phase has a temperature between 10 to 70° C., optionally between 45 to 60° C. or 50 to 55°.

In another embodiment, the first and/or third liquid phases are maintained at a temperature compatible with the edible fat phase such that the temperature of the edible fat phase does not drop and/or the edible fat does not solidify when the phases are combined. This allows the temperature to remain relatively constant through the emulsification process so that the emulsified product remains stable, homogeneous, and does not crystallize or solidify in the process otherwise causing inconsistent product quality or plugging of injection needles.

Accordingly, in another embodiment, the first liquid phase and/or second liquid phase is maintained at a temperature such that the temperature of the second liquid phase does not drop and/or the second liquid phase does not solidify when the phases are combined. Optionally, the first liquid phase and/or third liquid phase has a temperature not more than 10, 9, 8, 7, 6 or 5° C. lower than the temperature of the second liquid phase. In another embodiment, the temperature of the first liquid phase and/or third liquid phase is between 10 to 70° C., optionally between 45 to 60° C. or 50 to 55°.

The liquid phases may be heated in batch methods, in continuous flow methods, or using a combination of both methods. In one embodiment, the temperature controlled liquid phases are combined using calibrated, quantity-based metering pumps which makes it possible to control ingredients in the final formulation.

The liquid phases are homogenized to provide an emulsified product. An object of the homogenization is to rapidly reduce the various ingredients in size such that a stable, consistent, high quality oil-in-water emulsion is formed. As used herein, the term "emulsified product" and "emulsion" refers to a homogenized mixture of the first liquid phase and the second liquid phase or a homogenized mixture of the first, second and third liquid phases. Any means of homogenizing the liquid phases may be used. In one embodiment, the liquid phases are homogenized by mechanical means. Various mechanical homogenizers may be used to perform the homogenization. An example of a mechanical homogenizer useful in the claimed methods is a homogenizer from IKA Works. In particular, the DISPAX-REACTOR® DRS from IKA Works is an inline ultra-high shear dispersing machine that functions as a mechanical homogenizer. The DRS 2000/10 is selected and fitted with a 3-stage generator with a fine/superfine/superfine rotor-stator assembly with the tip velocity of the rotors operating at 7,900 fpm. The ingredients are rapidly reduced in size by a combination of extreme turbulence, cavitation and extremely high shear. The resultant product stream is composed of droplets and solid particles down to the nanoscale which provides long-term stability which reduces the need for emulsifying agents and thickeners.

For example, in one embodiment of the claimed methods, the liquid phases are fed in-line and continuously directly into the chamber of a rotor-stator mechanical homogenizer by means of a dosing flange. The phases to be mixed do not come in contact with each other until inside the mixing chamber of the homogenizer in order to prevent unwanted reactions such as separation and fat globule formation. It is known from the prior art that oil or melted fat does not distribute uniformly throughout a water solution without emulsifiers, so premixing and holding such mixture is not feasible because the components are not compatible with one another. In practice, the oil or melted fat phase is expensive, and if mixed to the final formulation will not remain homogeneous and suitable for use later. Thus, in one embodiment, the liquid phases are combined immediately prior to, or during, homogenization.

Optionally, a calibrated feed auger mechanically feeds dry powder ingredients accurately to combine with a liquid phase in the chamber. The mechanical homogenizer is optionally fitted with a 3-stage generator with a fine/superfine/superfine rotor-stator assembly with the tip velocity of the rotors operating at 7,900 fpm. The ingredients are rapidly reduced in size by a combination of extreme turbulence, cavitation and mechanical shearing. The resultant product stream comprises droplets and solid particles down to the nanoscale which provides long-term stability which reduces the need for emulsifying agents and thickeners.

A minimum of 25 psi back pressure is optionally applied on the resultant emulsion stream to prevent air from entering the generation chamber of the homogenizer and thereby precluding the formation of foam, and floods the homogenizer which recirculates the product repeatedly in the chamber to optimize the process of emulsification. A drop in pressure triggers the shutdown of the processing system.

In one embodiment, the mean size of the particles in the emulsified product is less than 10 μM, optionally less than 9.5, 9.0, 8.5, or 8.0 μM. In another embodiment, the median size of the particles in the emulsified product is less than 10 μM, optionally less than 9.5, 9.0. 8.5, or 8.0 μM.

One advantage of the methods disclosed herein is that an external, or additional, emulsifying agent is not needed. Some commonly used emulsifying agents include, but are not limited to, tragacanth, sodium lauryl sulfate, sodium dioctyl sulfosuccinate, and polymers known as Spans® or Tweens®. Accordingly, in another embodiment, the emulsified product is free from an emulsifying agent.

In an embodiment, the emulsified product is maintained at a temperature that keeps the emulsified product in a liquid form and thereby allows the product to be injected into food. Optionally, the emulsified product is maintained at 45 to 70° C., optionally 50 to 65° C. or about 55 to 60° C. In some embodiments, particular ingredients and conditions allow a temperature less than 45° C., optionally less than 30, 20 or 10° C.

The emulsion stream continues to the reservoir of the injector. The food product is injected or otherwise enhanced with a sufficient amount of the emulsified product to cause a weight increase of about 1 to 30%, optionally 5-25% or 10-20% or about 12%, 17% or 28% by weight of the food product until the food product retains essentially all the composition.

Various means of injecting a food product are known. In one embodiment, the food product is injected using a needle. Optionally, the needle is 2 to 5 mm thick or about 3 mm thick. Injecting the emulsion directly into the food product allows uniform incorporation and rapid penetration of ingredients. This method is also referred to as "spray pumping" (injection under pressure) and allows rapid diffusion within the meat fibers. With this procedure, the ingredients are pumped into the food product with a needle that has a number of holes along its length. Gangs of needles may be employed to inject the emulsion at multiple points. Needle centers are ⅝ inch to 1¼ inches apart. The pressure of the liquid forces a relatively uniform distribution of the ingredients throughout the meat. In one embodiment, the emulsified product is injected in a uniform manner throughout the food product. In another embodiment, the emulsified product is injected into a specific area of the food product, for example, a turkey breast.

The emulsified product can be injected into a fresh, chilled food product. For example, the food product may be between 2 and 10° C. or about 4° C.

In one embodiment, following injection, the fresh chilled food product is immediately reduced to a temperature sufficient to cause the edible fat to solidify in the food product, thereby sealing in the juices during distribution and during cooking by the consumer. In one embodiment, the temperature of the injected food product is not higher than 4, 6, 8 or 10° C.

In a further embodiment, un-injected emulsified product that returns to the injector reservoir is continually metered back to the mechanical homogenizer for continuous reprocessing. A limitation in typical meat injection systems is that the injection solution is subjected to continual shear as it flows through the injector manifold, needles, pumps and screens which causes oil to begin to recrystallize and form fat globules. Continuous reprocessing provides for the possibility of maintaining the temperature and uniformity of the injection solution and prevents fat from crystallizing in the reservoir or needles.

The injected food product may be further processed by packaging (for example, vacuum packaging), chilling, and/or freezing (for example, quick-freezing). The frozen food product can be defrosted and cooked, for example, by the consumer. Methods of cooking both fresh and frozen food products are well known in the art. The result is a moist, juicy, tender, natural-looking meat or poultry product that is not dried out or overcooked.

Any type of food product can be treated according to the methods of the present disclosure, including, but not limited to turkey, chicken, beef, veal, pork, lamb and fish. These foods have a tendency to dry out when cooked for a long period of time or at high temperatures, and become stringy. Using the methods of the present disclosure, the food product is maintained in a more natural state after cooking without the limitations of using excessive levels of salt beyond what is needed for taste, and without using phosphates, emulsifiers and other additives not commonly used by consumers and chefs.

The disclosed methods can be performed manually. A person of skill in the art will also readily appreciate that the disclosed methods are also amenable to use in a batch process system or a continuous process system. Performance of the disclosed methods in an industrial setting can be controlled manually or through a commercial PLC (Programmable Logic Controller) system.

Products

Another object of the disclosure is to provide an emulsified product useful for injection into a food product. The emulsified product is optionally prepared by the methods disclosed herein. In particular, an emulsified product for injection into a food product is provided comprising:

a first liquid phase comprising at least one water soluble component dissolved in water, and a second liquid phase comprising an edible fat, wherein the emulsified product is homogenized.

The edible fat optionally comprises butter, olive oil, corn oil, canola oil, soybean oil, margarine, yogurt or any combination thereof. The water soluble component optionally comprises salt, sea salt, seasoning, broth or flavouring extract or any combination thereof.

The emulsified product can comprise the first liquid product and the second liquid product in any amount. In one embodiment, the emulsified product comprises 20 to 40% of the first liquid phase and 60 to 80% of the second liquid phase by weight.

In some embodiments, the emulsified product comprises a third phase comprising an insoluble component. The third phase may be a liquid phase or a dry phase (for example, a dry granular or powder addition). The insoluble component optionally comprises spices, herbs, vegetable gum, starch or any combination thereof. The final food product can comprise 0.3% to 3%, optionally about 1% of the third phase by weight.

The emulsified product is optionally maintained at a temperature above the melting point of the edible fat. This temperature allows the emulsified product to remain homogenized and/or sufficiently liquid such that it can be injected into meat. Optionally, the temperature of the emulsified product is 45 to 70° C., optionally 50 to 65° C. or about 55 to 60° C.

The emulsified product of the present disclosure does not require any additional emulsifying agents. Accordingly, in one embodiment, the emulsified product is free from an emulsifying agent such as tragacanth, sodium lauryl sulfate, sodium dioctyl sulfosuccinate, and polymers known as Spans® and Tweens®.

In other embodiments, the mean size of the particles in the emulsified product are less than 10 µM, optionally less than 9.5, 9.0, 8.5 or 8.0 µM.

A further object of the disclosure is to provide a food product produced by the methods disclosed herein. The disclosure further provides a food product comprising the emulsified products disclosed herein.

The food product is optionally a meat or poultry product, for example, a turkey. In other embodiments, the meat product is chicken, beef, veal, pork, lamb or fish.

In one embodiment, the food product comprises 1 to 30%, 5-25%, 10-20% or about 12%, about 17% or about 28% emulsified product by weight of the food product.

In another embodiment, the food product comprises 1 to 5%, optionally about 3% added fat (enhanced fat) by weight of the food product.

The food product may be packaged and/or processed in any manner. In one embodiment, the food product is vacuum packaged. In other embodiments, the food product is refrigerated or frozen, optionally quick frozen. The food product may also be fresh, thawed, cooked or partially cooked.

Terms of degree such as "about", "substantially", and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The above disclosure generally describes the present disclosure. A more complete understanding can be obtained by reference to the following specific examples. These examples are described solely for the purpose of illustration and are not intended to limit the scope of the disclosure. Changes in form and substitution of equivalents are contemplated as circumstances might suggest or render expedient. Although specific terms have been employed herein, such terms are intended in a descriptive sense and not for purposes of limitation.

The following non-limiting examples are illustrative of the present disclosure:

EXAMPLES

Example I. Oil-in-Water Infused Turkey

Figure 2:
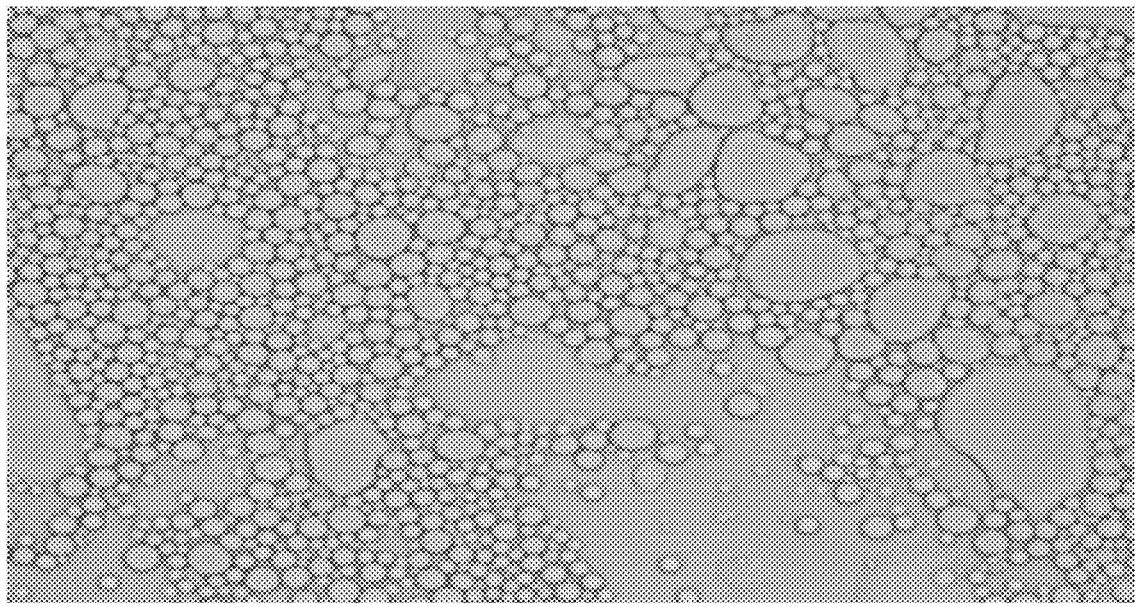
FIG. 2 shows microscopy sample 2A.
Figure 3:
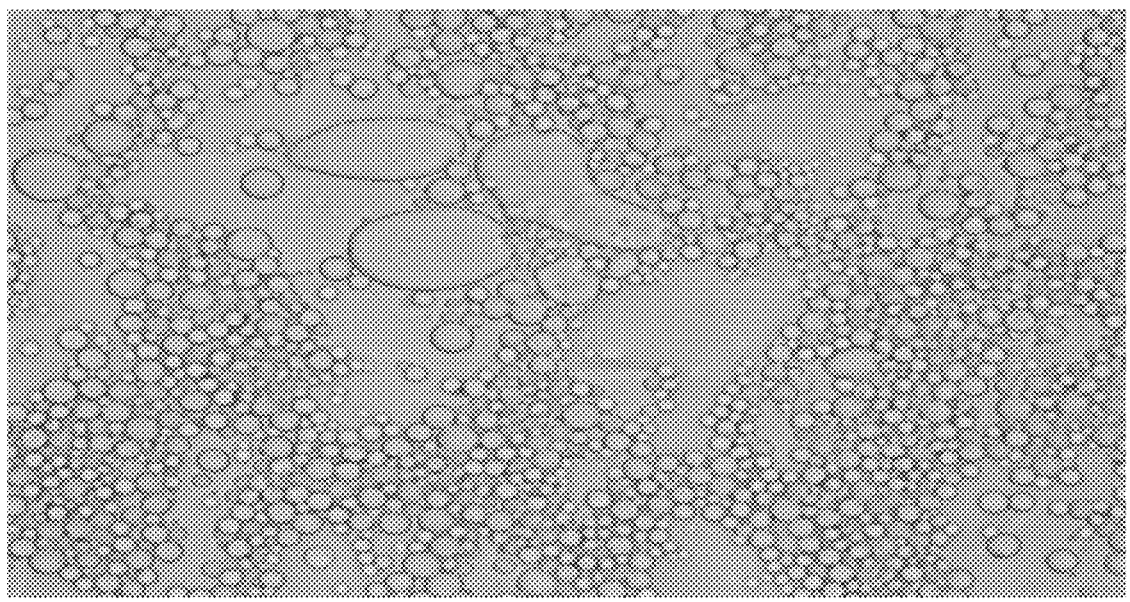
FIG. 3 shows microscopy sample 2B.
Figure 4:
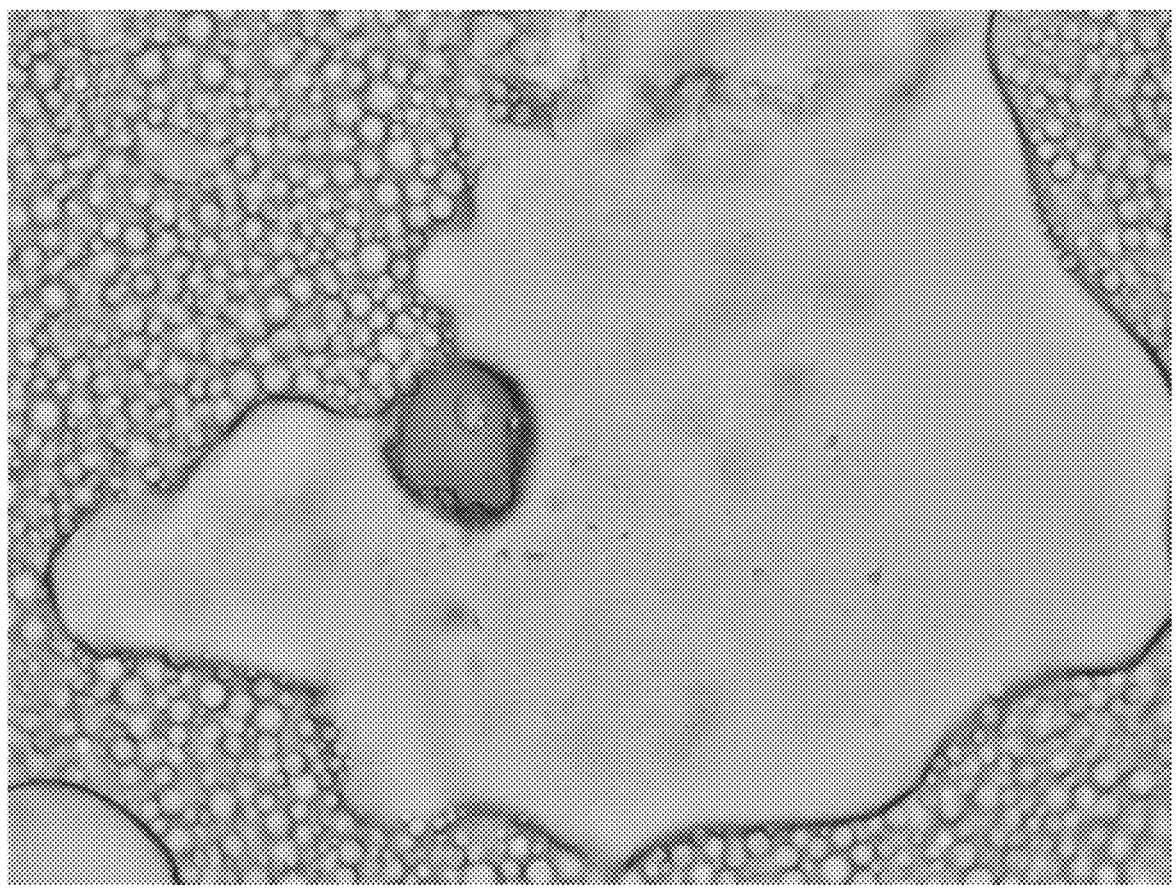
FIG. 4 shows microscopy sample 2C.

Into 100 parts by weight of hot water of 50° C., 5 parts by weight of sea salt were added in a brine formulation tank and completely dissolved therein to make a brine solution, and transferred to a supply tank and held at 50° C. Butter was melted in a melting tank to 50-55° C., and transferred to a supply tank and held at 50-55° C. The two liquid phases were metered with high accuracy by means of positive displacement pumps calibrated to deliver the prescribed formulation, to a dosing flange which combines and feeds the brine solution and liquid butter simultaneously into an inline rotor-stator mechanical homogenizer. Liquid butter was added in an amount of 47 parts by weight per 105 parts by weight of the brine solution (31%:69% respectively to result in 25.5% butterfat). The mechanical homogenizer was fitted with a 3-stage generator with a fine/superfine/superfine rotor-stator assembly with the tip velocity of the rotor operating at 7,900 fpm. The combined flow exiting the mechanical homogenizer was subjected to a back pressure of 25-30 psi. The ingredients were rapidly reduced in size forming a stable, consistent, high quality oil-in-water emulsion between 55-60° C. Samples of this emulsion were tested for dispersion (FIG. 1) and microscopy (FIGS. 2-4) more than 24 hours later. The product stream continued to the reservoir of the injector. The composition was injected into a turkey in an amount 14% by weight of the turkey. The meat retained essentially all of the composition. The temperature of the enhanced turkey was 8° C. three minutes after injection. The turkey was immediately vacuum packaged and quick frozen to −20° C. Five days later, samples were taken out, thawed, and evaluated and also subjected to cooking evaluation. The results are shown in Table 1.

TABLE 1

|  | Test<br>Oil-in-Water Infused Turkey | Control<br>Injected Solution Turkey |
| --- | --- | --- |
| Evaluation of raw meat: | Normal to lower purge level<br>Emulsified ingredients dispersed and fixed uniformly in meat tissues<br>No tiger striping areas evident | Normal purge level<br>Normal situation |
| Cooking evaluation: | Appealing aroma of butter and attractive appearance while roasting<br>Very juicy and tender<br>Delicious taste | Normal aroma and appearance while roasting<br>Normal juiciness and tenderness<br>Normal good taste |

As described in Table 1, no "tiger striping" was seen in the final product. Tiger striping is a problem condition seen in the meat after cutting showing visible tracks left by injector needles in the finished product.

"Purge level" is a problem condition with excess juices seen in packages of the product, or amount of cooked out juices accumulating in the pan.

"Juiciness" is an important quality characteristic of cooked meats. Differences in juiciness are distinguished by judges evaluating the product for this sensory trait.

"Tenderness" is another important quality characteristic of cooked meats. Shear values are determined by instrumental methods to objectively distinguish textural differences between samples. Typically, differences in texture are distinguished by judges evaluating the product for this sensory trait.

This technology thereby provides a convenient and effective method of incorporating oil and fat ingredients such as extra virgin olive oil or butter uniformly into lean meat products without the meat having too much oil or fat. Previous methods localized margarine or butter in the turkey breast only, and limited the enhancement to 3%. Here, by incorporating the oil or fat in an emulsion with water, the fat enhancement may still be equivalent to about 3% in the breast but it is now evenly distributed throughout the meat product.

In addition, previous methods were limited to brine, a solution of common salt in water plus other water soluble flavouring and curing ingredients. In the methods described herein, relatively small amounts of oil or fat can be added to the brine in making an oil-in-water emulsion and incorporated into lean meat products to contribute flavour and juiciness. Moisture added is cooked off leaving oil and flavouring ingredients behind to enhance the flavour and juiciness of the cooked product.

Other advantages of the present method include spray pumping (injection under pressure) the emulsion to facilitate rapid diffusion within the meat fibers. The emulsion is not localized in spots but uniformly distributed. It is not distributed in fat or skin.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

The invention claimed is:

1. A food product comprising an emulsified product, the emulsified product comprising:
    a first liquid phase comprising at least one water soluble component dissolved in water, the water soluble component comprising salt, sea salt, seasoning, broth or flavouring extract and
    a second liquid phase comprising an edible fat, the edible fat comprising butter, olive oil, extra virgin olive oil, corn oil, canola oil, soybean oil, margarine, sour cream or yogurt,
    wherein the emulsified product comprises about 70% of the first liquid phase and about 30% of the second liquid phase by weight,
    wherein the emulsified product is homogenized such that the mean size of the particles in the emulsified product are less than 10 uM in diameter,
    wherein the emulsified product is maintained at a temperature of 45° C. to 70° C.,
    wherein the emulsified product is free from an added emulsifying agent, and
    wherein the food product is turkey and the emulsified product is dispersed in meat tissue of the turkey.

2. The food product of claim 1, wherein the food product comprises 1 to 30% of the emulsified product by weight of the food product.

* * * * *